(12) United States Patent
Griffiths et al.

(10) Patent No.: US 8,591,124 B2
(45) Date of Patent: Nov. 26, 2013

(54) SYSTEM FOR PLUGGING A FIBRE OPTIC CABLE INTO A FIBRE OPTIC RECEPTACLE AND CABLE ADAPTOR THEREFOR

(75) Inventors: Ian Griffiths, Hampshire (GB); Paul Hubbard, New South Wales (AU)

(73) Assignee: Prysmian Cables & Systems Limited, Hampshire (GB)

( * ) Notice: Subject to any disclaimer, the term of this patent is extended or adjusted under 35 U.S.C. 154(b) by 716 days.

(21) Appl. No.: 12/310,617

(22) PCT Filed: Sep. 5, 2006

(86) PCT No.: PCT/GB2006/003285
§ 371 (c)(1),
(2), (4) Date: Jul. 12, 2010

(87) PCT Pub. No.: WO2008/029072
PCT Pub. Date: Mar. 13, 2008

(65) Prior Publication Data
US 2010/0272399 A1    Oct. 28, 2010

(51) Int. Cl.
*G02B 6/36* (2006.01)
(52) U.S. Cl.
USPC .............. 385/78; 385/76; 385/77; 385/84; 385/86; 385/87
(58) Field of Classification Search
USPC ........................... 385/78, 86, 87, 135
See application file for complete search history.

(56) References Cited

U.S. PATENT DOCUMENTS

| | | | |
|---|---|---|---|
| 5,416,874 A * | 5/1995 | Giebel et al. .................. 385/100 |
| 6,899,467 B2 * | 5/2005 | McDonald et al. ............. 385/78 |
| 7,108,430 B2 | 9/2006 | Finona et al. |
| 7,572,066 B2 | 8/2009 | de Jong et al. |
| 2002/0164130 A1 | 11/2002 | Elkins, II et al. |
| 2005/0105876 A1 | 5/2005 | Finona et al. |

FOREIGN PATENT DOCUMENTS

CN       1523387 A    8/2004
WO    WO 2006/043967 A1    4/2006

* cited by examiner

*Primary Examiner* — Ryan Lepisto
(74) *Attorney, Agent, or Firm* — Finnegan, Henderson, Farabow, Garrett & Dunner, L.L.P.

(57) ABSTRACT

A system for plugging a fibre optic cable into a fibre optic receptacle includes: a base element having at least one base port, and an adapter unit having at least one adapter, the at least one adapter and the at least one base port being spaced of a predetermined length. The system includes a cable adaptor associated with the fibre optic cable, the cable adaptor including a connector for being plugged into the adapter; an anchoring device for anchoring the fibre optic cable to said base port, and a connector retaining element for receiving the connector and a cable end portion, the connector retaining element defining the predetermined length and removably engaging with the anchoring device. A cable adaptor for a fibre optic cable and a method of installing a fibre optic cable into a fibre optic receptacle, especially into a joint closure, are also described.

46 Claims, 10 Drawing Sheets

SYSTEM FOR PLUGGING A FIBRE OPTIC CABLE INTO A FIBRE OPTIC RECEPTACLE AND CABLE ADAPTOR THEREFOR

CROSS REFERENCE TO RELATED APPLICATION

This application is a national phase application based on PCT/GB2006/003285, filed Sep. 5, 2006, the content of which is incorporated herein by reference.

BACKGROUND OF THE INVENTION

The present invention relates to a system for plugging a fibre optic cable into a fibre optic receptacle.

In particular, the present invention relates to a system for plugging a fibre optic cable into a joint closure, said fibre optic cable being provided with a cable adaptor.

Moreover, the present invention relates to a cable adaptor for plugging a fibre optic cable into a fibre optic receptacle, e.g. a joint closure.

Furthermore, the present invention relates to a method of installing a fibre optic cable into a fibre optic receptacle.

DESCRIPTION OF RELATED ART

Fibre optic cables are used in an increasing number and variety of applications, such as a wide variety of telecommunications and data transmission applications. As a result, fibre optic networks include an ever increasing number of enclosures in which one or more of the optic fibres are interconnected or otherwise terminated. These enclosures also provide protection for the optic fibres from moisture or any other form of environmental degradation. More particularly, these enclosures provide protection for the point at which the optical fibres are spliced or otherwise optically connected.

Documents US 2002/0164130 and U.S. Pat. No. 6,899,467 relate to pre-connectorized fibre optic cables.

In detail, document US 2002/0164130 discloses an optical fibre connector which comprises a crimp assembly and a fibre crimp tube disposed therein. The fibre crimp tube has a shoulder that is fixedly captured within the crimp assembly such that the core of the fibre optic cable does not exhibit movement relative to the connector. A heat shrink tube is optionally provided to connect an end of the tubular body to the cable to minimize the bend radius. The fibre crimp tube may also have an inner compression sleeve disposed between the fibre crimp tube and the core of the cable. The fibre crimp tube may also be covered by a water resistant material to protect the cable. Additionally, the fibre crimp tube may comprise two portions connected by a living hinge. The two portions may be attached to the fibre optic cable by a heat shrink sleeve, an O-ring or a crimp tube.

Document U.S. Pat. No. 6,899,467 relates to a fibre optic plug which is provided to facilitate pulling of the fibre optic plug and an associated fibre optic cable through small passageways. The fibre optic plug may include a shroud that protects the fibre optic connector and that may further define at least one opening, and preferably a pair of openings. The openings are sized to receive portions of an adapter sleeve once the fibre optic plug is mated with a fibre optic fibre optic receptacle. The fibre optic plug may also include a cap mounted upon and adapted to swivel relative to the remainder of the fibre optic plug to serve as a pulling grip during installation of the fibre optic cable. Further, the fibre optic plug may include a crimp band that is mechanically coupled to both the fibre optic cable and the plug body in order to isolate the fibre optic connector from torque otherwise created by forces to which the fibre optic cable is subjected. The fibre optic plug includes a connector which is located in a connector housing, the latter being part of the plug and thus being not removed during plugging into a fibre optic receptacle, e.g. a fibre optic joint closure.

In order to assist in establishing a communication link in a fibre optic network, a pre-connectorized fibre optic cable allows that a rapid connection of the network fibres can be advantageously carried out.

In particular, the Applicant has observed that connectorizing a fibre optic cable in situ by an installer is not advisable since said operation is time consuming and needs to be carried out in a safe and controlled environment by very skilled technical personnel.

When an optic cable, which includes an optic fibre, has to be connected to an apparatus, a joint housing or a similar installation (hereinafter called "receptacle"), two elements have to be connected: a) the optic fibre has to be optically connected to the optic element of the receptacle, so that the desired optic connection is obtained, and b) the optic cable has to be mechanically connected to the receptacle enclosure in which the optical element is housed.

The Applicant has faced the problem of providing a construction of the optic cable end and of the receptacle to which the cable end has to be connected and secured, which allows the installation process to be carried out very quickly and without the need for skilled technical personnel.

SUMMARY OF THE INVENTION

The Applicant has found that by predetermining and maintaining at a constant value the distance between an optic connector housing and the cable anchoring element of the receptacle to which the cable has to be optically and mechanically connected, and by providing a retaining element coupled with a cable adaptor—which is factory secured to the cable end and which bears a housing for an optic connector, said connector being factory coupled to the optic fibre—the cable end can be assembled in the factory, i.e. in a controlled environment, while the final mechanical and optic connections of the cable to the receptacle in the field is made easier and without need of specialized operators and tools.

Moreover, the Applicant has found that by providing a particular construction for the protective cap of the connector retaining element, the cap itself can be used as a tool for allowing a fast and precise assembly of the connector retaining element, and thus of the cable adaptor, over the cable end. Furthermore, according to the present invention, the connector retaining element in combination with the protective cap thereof advantageously ensures that the optical fibres are suitably protected during storage/transport of the pre-terminated fibre optic cable.

The present invention relates to a system for plugging a fibre optic cable into a fibre optic receptacle, said fibre optic receptacle comprising:

a base element comprising at least one base port, and
an adapter unit comprising at least one adapter, said at least one adapter and said at least one base port being spaced of a predetermined length;
said system comprising a cable adaptor associated to said fibre optic cable, the cable adaptor comprising:
a connector for being plugged into said adapter;
an anchoring device for anchoring said fibre optic cable to said base port, and
a connector retaining element for receiving the connector and a cable end portion, the connector retaining element defining said predetermined length and removably engaging with the anchoring device.

A connector is a mechanical device which is used to align and join together two or more optical fibres thereby providing a means for attaching to, and decoupling from, a fibre optic receptacle. Generally, a connector comprises a long and thin cylinder—named "ferrule"—that is bored through the centre thereof so as to contain the optical fibre. The ferrule acts as a fibre alignment mechanism, therefore the optical fibre is inserted into the ferrule in such a way that the end of the optical fibre is located in correspondence of the ferrule end portion. Typical examples of connectors are SC, FC, LC, ST, E2000 connectors.

In the present description, the term "fibre optic receptacle" is used to indicate any fibre optic equipment or device to which a connector can be attached to and decoupled from. For example, a fibre optic receptacle can be a joint closure (wherein the optical fibre of the pre-connectorized optic cable mentioned above is connected to the optical fibre of a further optic cable), a transmitter or a receiver. Generally, a fibre optic receptacle comprises a base element and an adapter unit. The base element is provided with at least one base port through which the pre-connectorized fibre optic cable is made to pass and to which the cable is fixed and sealed. The adapter unit is provided with at least one adapter for receiving the cable connector and making the optic connection. The adapter is a mechanical device which is used to align and join two or more optical fibres having different connection types. The base element and the adapter unit are spaced from each other of a certain distance which can vary from case to case, e.g. according to the type of fibre optic receptacle being used.

Therefore, according to the present invention, the Applicant has found that the distance between the base element and the adapter unit of the fibre optic receptacle has to be predetermined and maintained uniform at a set constant value. Moreover, the Applicant has found that said predetermined and constant value has to be provided also to the cable adaptor so that the distance between the connector end portion and the anchoring device of the cable adaptor substantially corresponds to the distance between the base element and the adapter unit of the fibre optic receptacle. According to the present invention, said predetermined and constant distance in the cable adaptor is obtained by providing the latter with a connector retaining element that covers the cable end and houses the cable connector.

In the present description, the term "cable adaptor" is used to indicate the assembly which comprises the optic connector and the anchoring device, the anchoring device engaging and sealing the fibre optic cable to a fibre optic receptacle.

Preferably, the fibre optic receptacle is a joint closure which comprises: a fibre routing system, for routing at least one optic fibre in the joint closure; at least one splicing tray, and at least one storage area of the optic fibre(s).

Furthermore, the present invention relates to a cable adaptor for a fibre optic cable which comprises at least one optic component, the cable adaptor comprising:
  a connector for creating a fibre optic connection between and end portion of the optic component and a fibre optic receptacle;
  an anchoring device for anchoring the cable to the fibre optic receptacle, and
  a connector retaining element for receiving the connector and said end portion of the optic component, the connector retaining element removably engaging with the anchoring device.

According to the present invention, the connector retaining element of the cable adaptor allows the pre-terminated fibre cable end to be safely stored and/or transported so that any critical movement thereof is substantially avoided. In particular, due to the flexibility of the cable, the connector retaining element avoids that the connector pivots with respect to the anchoring device, an excessive pivotal movement possibly inducing stresses on the fibres and thus adversely affecting the optical transmission thereof as well as the optic connection between the connector and the cable. Moreover, the connector retaining element according to the present invention substantially avoids any axial movement of the connector with respect to the anchoring device along the cable longitudinal axis, said axial movement modifying the distance between the connector and the anchoring device, thereby negatively influencing the reliability of the connector. Moreover, the connector retaining element according to the present invention allows that the pre-terminated fibre cable end is mechanically and environmentally protected during storage/transport of the cable. Finally, according to the present invention, the fibre optic cable can be pre-connectorizing directly in the factory so that the cable adaptor is associated to the cable in a safe and controlled environment where very skilled technical personnel as well as appropriate machinery (available for fitting, machining, polishing and testing the connector before the cable assembly is sent out for installation) can be advantageously used The connector retaining element of the cable adaptor according to the present invention substantially encapsulates the connector when engaged with the anchoring device. Moreover, the connector retaining element further encapsulates the cable portion which is interposed between the connector and the anchoring device. Therefore the connector retaining element has a length which corresponds to the sum of the connector length and the cable portion length mentioned above. The connector retaining element is shaped to house the connector and the cable portion, thereby surrounding and contacting the outer profile of both the connector and the cable portion.

According to the present invention the anchoring device comprises an anchoring element and an adaptor body. In detail, the anchoring element is located in a position radially external to the adaptor body and in proximity of the axial end of the connector retaining element which is opposite to the connector.

The cable adaptor according to the present invention further comprises a seal which is interposed between the connector retaining element and the anchoring element. Preferably, the seal is an O-ring. The seal contributes in providing a watertight enclosure for the connector when the latter is installed into a fibre optic receptacle, e.g. when plugged into a joint closure, as well as when a protective cap—which engages with the connector retaining element—is provided around the connector during storage and/or transport of the pre-terminated fibre optic cable.

The cable adaptor further comprises a sleeve for attaching the adaptor body to the cable. Preferably, the sleeve is a heat shrinkable sleeve.

The present invention further relates to a method of installing a fibre optic cable into a fibre optic receptacle, said fibre optic receptacle comprising:
  a base element comprising at least one base port, and
  an adapter unit comprising at least one adapter, said at least one adapter and said at least one base port being spaced of a predetermined length;
  said method comprising the steps of:
  providing the fibre optic cable with a cable adaptor which comprises:
  a connector;

an anchoring device, and a connector retaining element for receiving the connector and a cable end portion, the connector retaining element defining said predetermined length;

disengaging the connector retaining element from the cable adaptor;

passing the connector through said base port;

plugging the connector into said adapter, and fixing the anchoring device to said base port.

BRIEF DESCRIPTION OF THE DRAWINGS

Embodiments of the invention will now be described with reference to the accompanying drawings, where like numerals are used to denote like components. In detail.

DESCRIPTION OF PREFERRED EMBODIMENTS

Figure 1:
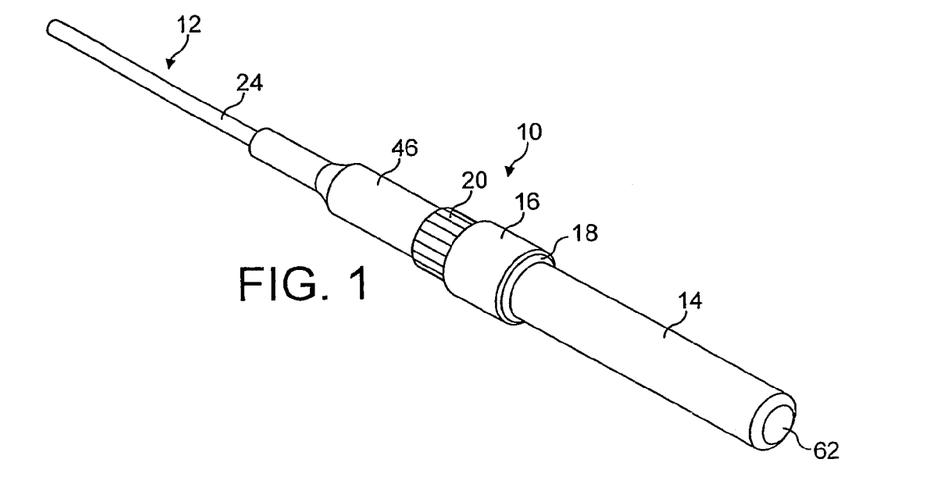
FIG. 1 illustrates a cable adaptor according to an embodiment of the present invention.

FIG. 1 shows a cable adaptor 10 according to an embodiment of the present invention. The cable adaptor 10 of FIG. 1 is represented connected to a fibre optic cable 12 which comprises an optic component 26—for transmitting an optical signal—and an outer protective sheath 24, in a radial outer position with respect to the optic component 26.

Figure 6:
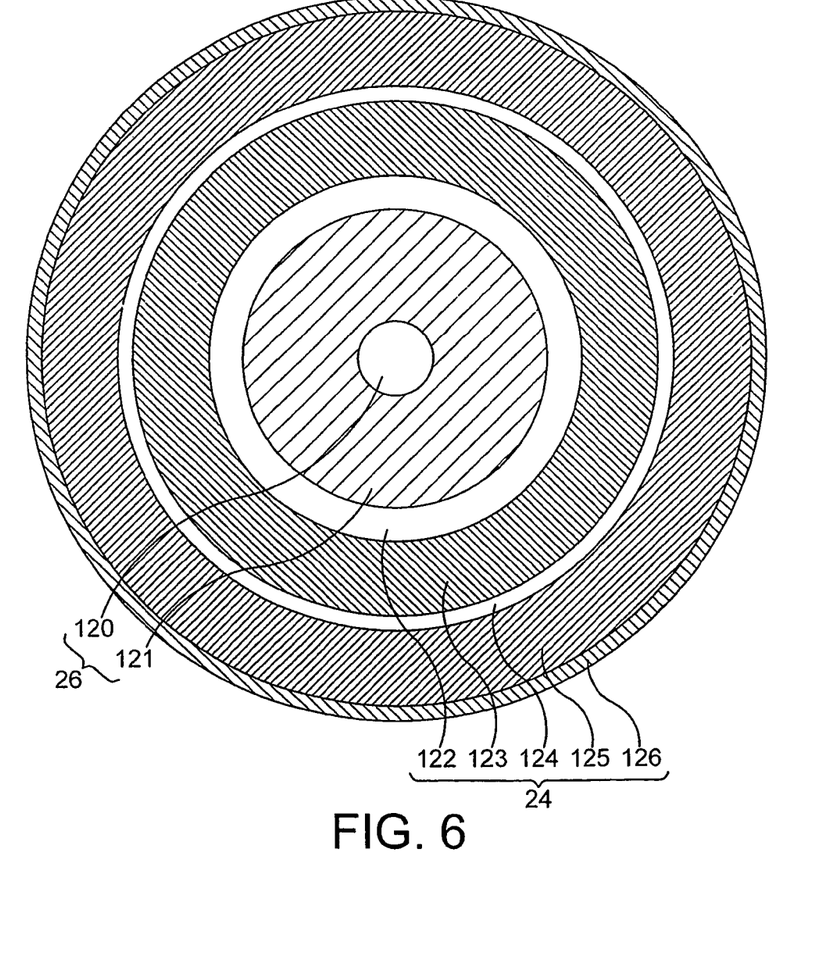
FIG. 6 shows a transverse cross-section of a fibre optical cable to which the cable adaptor of FIGS. 1-5 can be applied.

FIG. 6 shows an example of a fibre optic cable 12 to which the cable adaptor 10 of the present invention can be advantageously connected.

In detail, the cable 12 shown in FIG. 6 comprises, starting from a radial inner position thereof: one optic fibre 120, a buffer tube 121 tightly enclosing the optic fibre 120, a water swellable yarn 122, an inner sheath 123, a water swellable yarn 124, an outer sheath 125 and a protective jacket 126. According to the cable 12 of FIG. 6, the optic component 26 comprises the optic fibre 120, the buffer tube 121, the water swellable yarn 122, the inner sheath 123 and the water swellable yarn 124. Moreover, according to the cable 12 of FIG. 6, the outer protective sheath 24 comprises the outer sheath 125 and the protective jacket 126. Preferably, the buffer tube 121 is made of Nylon. Preferably, the inner sheath 123 is made of PVC. Preferably, the outer sheath 125 is made of Polyethylene. Preferably, the protective jacket 126 is made of Nylon. Preferably, the optic component 26 further comprises at least one longitudinal reinforcing yarn (not shown in FIG. 6). Preferably, the fibre optic cable 12 is provided with only one optic fibre. Alternatively, the fibre optic cable 12 comprises at least two optic fibres.

The cable adaptor 10 comprises a connector 30 for creating a fibre optic connection between an end portion of the optic component 26 and a fibre optic receptacle, e.g. a joint closure.

Figure 7:
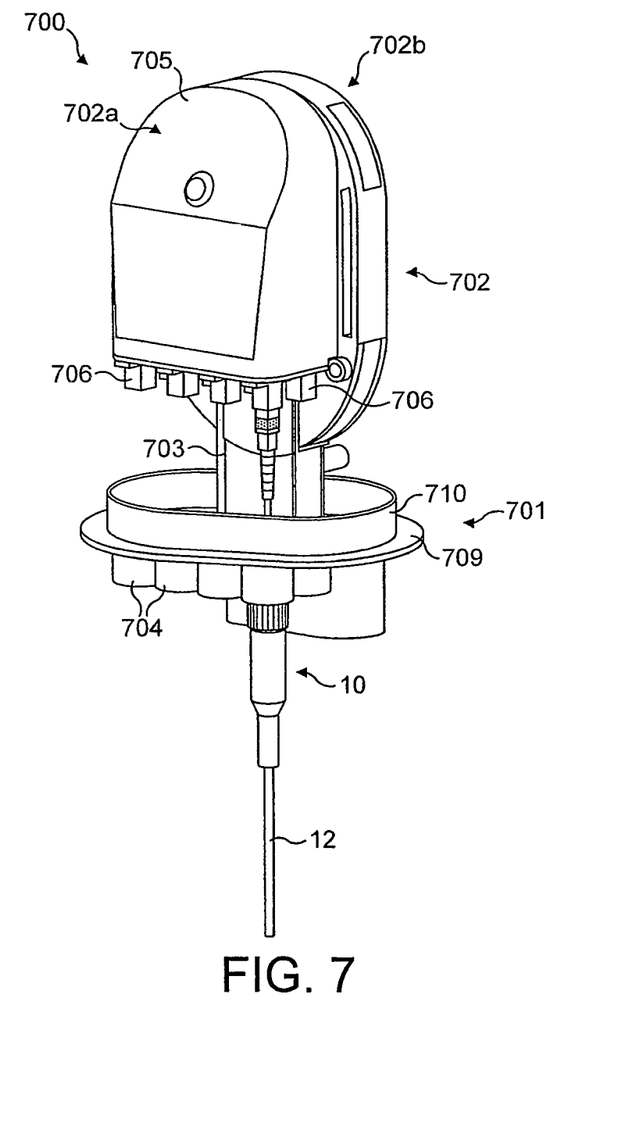
FIG. 7 shows a perspective view of a joint closure to which the cable adaptor of FIGS. 1-5 is connected.
Figure 8:
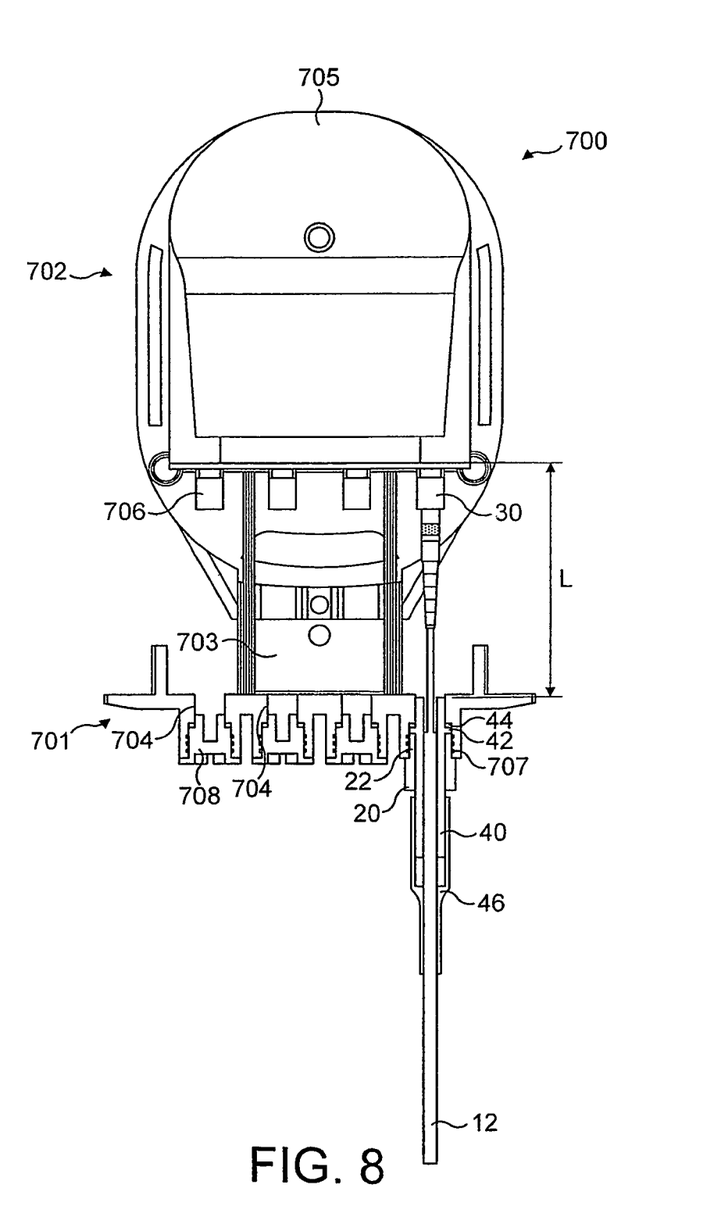
FIG. 8 shows a partial front view of the joint closure of FIG. 7, some elements of the joint closure being represented in cross section.

FIGS. 7 and 8 show a joint closure 700 which comprises a base element 701 and an adapter unit 702 associated to the base element 701 by means of a bracket 703. The base element 701 is provided with a plurality of base ports 704 through one of which the pre-connectorized fibre optic cable 12 is made to pass and to which the cable is fixed and sealed. The base element 701 comprises a flange 709 and a wall 710 suitable for, respectively, supporting and guiding a protective cap (not shown in FIGS. 7 and 8) which encloses the adapter unit 702 once the fibre optic connection has been successfully performed. The adapter unit 702 generally comprises a front side 702a and a rear side 702b. The front side 702a generally locates a fibre routing system which is not shown in FIGS. 7 and 8 since a cap 705 is provided thereupon, the fibre routing system allowing that the optic fibres are correctly routed within the joint closure 700. The rear side 702b generally locates the splicing tray(s) and the storage area(s) of the optic fibres. The adapter unit 702 is provided with a plurality of adapters 706 for receiving the connector 30 and making the optic connection.

In the embodiment illustrated in the figures the connector 30 is a standard SC connector. However, any type of connector can be used in the cable adaptor of the present invention, such as, for instance, FC, LC, ST, E2000 connectors.

Figure 2:
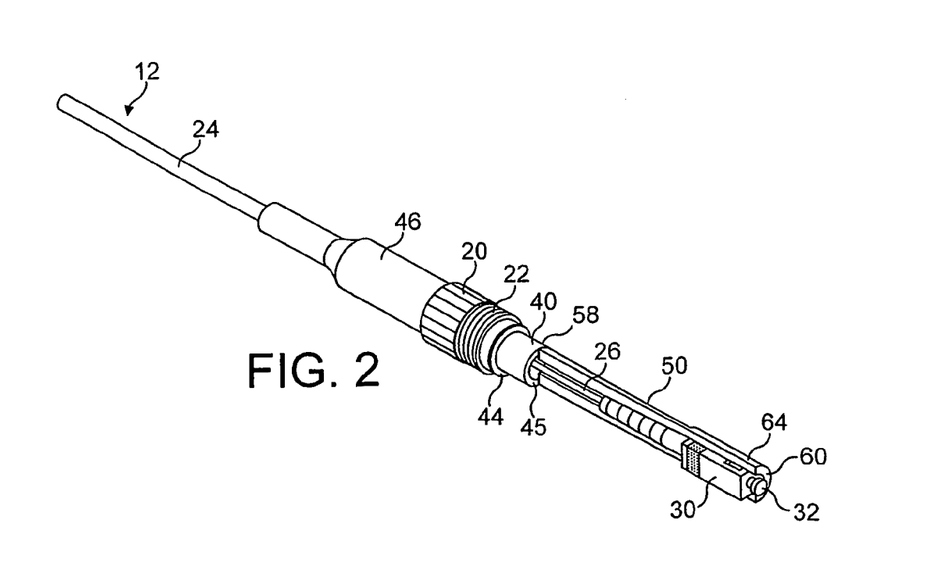
FIGS. 2 and 3 illustrate details of the cable adaptor of FIG. 1.

As shown in FIGS. 1 and 2, the cable adaptor 10 further comprises an anchoring device 200. The anchoring device comprises an anchoring element 20 for anchoring the cable 12 to the fibre optic receptacle 700. The anchoring element 20 is provided with a threaded portion 22 (shown in FIG. 2) the function of which will be described in detail in the following of the present description.

According to the present invention, the cable adaptor 10 comprises a connector retaining element 50 which houses the connector 30 and a predetermined length of the optic component end portion. The connector retaining element 50 extends along the longitudinal extension of the cable and has a shell shape for safely and correctly housing the connector and the optic component end portion. Alternatively (not shown in the figures), the connector retaining element 50 can comprise two distinct shells that are suitably shaped to mate together in order to obtain a cylindrical element inside of which the connector and the cable optic component end portion are safely housed. Moreover, the connector retaining element 50 removably engages with the anchoring device 200 so that the connector retaining element can be disengaged from the cable adaptor when the connector has to be introduced into the fibre optic receptacle 700.

The cable adaptor 10 further comprises a protective cap 14 which is suitable for enclosing thereinto the connector retaining element 50 in order to preserve the connector 30 from the external environment (e.g. from dirt, moisture and water) during storage and/or transport of the cable 12. The protective cap 14 is substantially cylindrical in shape and is provided with a cavity the shape of which advantageously mates the cable adaptor components which are enclosed inside the protective cap. In detail, the protective cap is provided with a cavity the shape of which at least partially mates the outer profile of the connector retaining element. Preferably, the cavity shape of the protective cap also suitably mates the outer profile of the connector portion and of the cable optic component portion that are not surrounded by the connector retaining element. The protective cap 14 comprises two distinct extremities which are axially spaced apart from each other: a first closed extremity that is located in correspondence of the optic component end portion which is associated to the connector 30, and a second open extremity which allows the cable 12, already provided with the connector 30 and the connector retaining element 50, to be introduced into the protective cap 14. The protective cap 14 further comprises a seat 16 in correspondence of said second extremity, the seat 16 having a shoulder 18 and being provided with a threaded portion (not visible in the figures) that is complementary with the threaded portion 22 of the anchoring element 20 so that the protective cap 14 can removably engage with the anchoring element 20. As mentioned above, the connector retaining element 50 removably engages with the anchoring device 200 by means of the protective cap 14. In fact, by unscrewing the protective cap 14 from the threaded portion 22 of the anchoring element 20, the connector retaining element 50 is allowed to disengage from the connector and the predetermined length of the optic component contained thereinto. Although a threaded engagement between the anchoring element 20 and the protective cap 14 is herein disclosed, further forms of engagement can be envisaged, e.g. a bayonet fitting or a snap fitting.

As shown in detail in FIG. 8, when the cable adaptor 10 is introduced into a joint closure 700, the threaded portion 22 of the anchoring element 20 is used to fix the adaptor 10 to the joint closure so as to create a fibre optic connection. In detail, the threaded portion 22 of the anchoring element 20 is screwed into a complementary threaded portion 707 possessed by the base port 704 of the base element 701 of the joint closure 700.

The anchoring device 200 further comprises an adaptor body 40 which surrounds the outer protective sheath 24 of the cable 12 and which is located in a radial inner position with respect to the anchoring element 20 (i.e. the anchoring element 20 at least partially surrounds and contacts the adaptor body 40). As shown in detail in FIG. 3, the adaptor body 40 includes a flange 42 in proximity of the adaptor body axial edge that faces the connector retaining element 50. The flange 42 has the function of allowing a correct positioning of the anchoring element 20 onto the adaptor body 40. In detail, the anchoring element 20 abuts the flange 42 in such a way that the anchoring element 20 is not allowed to move towards the connector retaining element 50. In fact, the inner diameter of the anchoring element 20 is smaller than the outer diameter of the flange 42. In more detail, the anchoring element 20 abuts the flange side which is opposite to the adaptor body axial edge that faces the connector retaining element 50.

Figure 3:
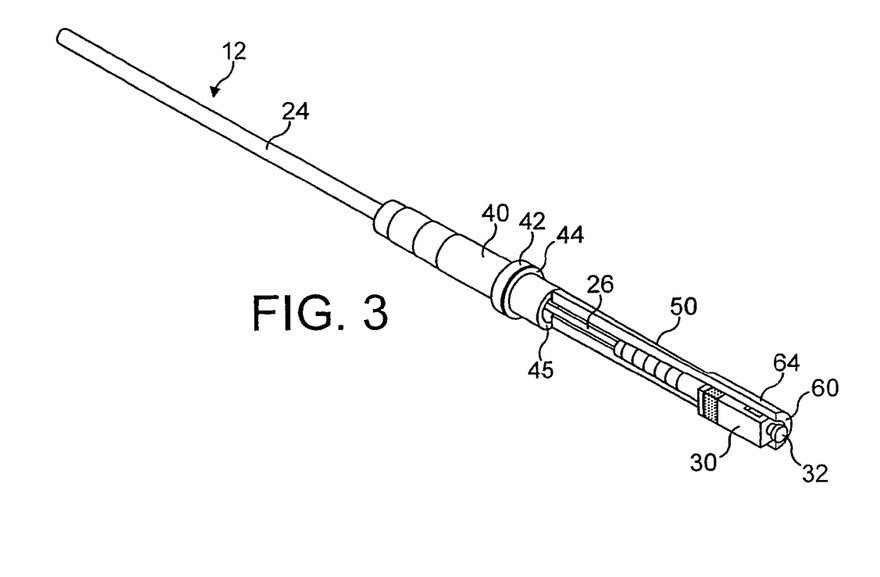

Furthermore, the adaptor body 40 further comprises a seal 44 which abuts the flange 42. In detail, the seal 44 abuts the flange side which faces the adaptor body axial edge in proximity of the connector retaining element 50. Preferably, the seal 44 is an O-ring. The seal 44 especially provides for a watertight seal of the cable adaptor from the external environment when the optic connection is established and thus when the cable adaptor is connected to a fibre optic receptacle. On the contrary, when the protective cap 14 engages with the anchoring element 20, the location of the flange 42 on the adaptor body 40 and the location of the shoulder 18 on the protective cap 14 ensures that the shoulder 18 engages with the seal 44, thereby creating a watertight enclosure for safely encapsulating the connector 30 during storage/transport of the cable.

The cable adaptor 10 further includes a sleeve 46 which surrounds the optic component end portion of cable 12 (i.e. the cable end portion to which the connector is associated) and at least a portion of the adaptor body 40, respectively. The sleeve 46 has the main function of firmly positioning the adaptor body 40 onto the cable 12. Moreover, the sleeve 46 also contributes in protecting the adaptor 10 from the external environment by providing a suitable sealing action between the cable outer protective sheath 24 and the adaptor body 40. Preferably, the sleeve 46 is a heat shrinkable sleeve.

In the case the cable 12 is provided with at least one strengthening member, the latter can be associated to the cable adaptor, e.g. to the adaptor body, thereby improving the fitting of the cable adaptor onto the cable.

Figure 4:
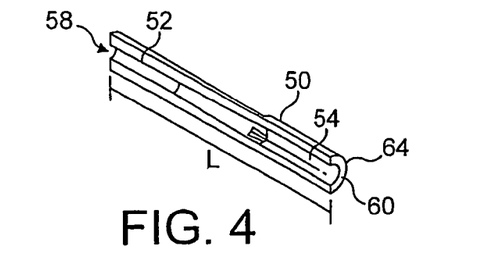
FIG. 4 illustrates a connector retaining element according to an embodiment of the present invention.

The connector retaining element 50 of the cable adaptor 10 is shown in greater detail in FIG. 4. The connector retaining element 50 has an outer shape which is substantially semi-cylindrical, while the inner shape is made to suitably mate the connector 30 and the optic component end portion which are housed inside the connector retaining element 50. In detail, the connector retaining element 50 comprises a cable holder 52 and a connector holder 54. As better illustrated in FIGS. 2 and 3, the cable optic component 26 is retained in the cable holder 52 whereas the connector 30 is retained in the connector holder 54. Referring back to FIG. 4, the connector retaining element 50 has a first end face 58, in correspondence of the cable holder axial edge, and a second end face 60, in correspondence of the connector holder axial edge. The connector retaining element 50 has a length L (shown in FIG. 4)—which is comprised between the first end face 58 and the second end face 60—corresponding to the distance L (shown in FIG. 8) defined between the connector end position, once the connector has been plugged into a joint adapter 706, and the axial edge 45 of the adaptor body 40, once the latter is introduced into a base port 704 corresponding to the joint adapter 706. Preferably, a base port 704 and a corresponding joint adapter 706 are substantially aligned along a rectilinear direction of the cable so that the latter, and specifically the optical fibre(s) thereof, is not subjected to mechanical stresses due to any possible bending of the cable.

In FIG. 8 only one base port 704 is shown to engage with a cable adaptor 10. The remaining base ports—which are not associated to any corresponding cable adaptors—are temporally closed with caps 708 that are screwed into said base ports.

As illustrated in FIGS. 2 and 3, the first end face 58 of the connector retaining element 50 abuts the edge 45 of the adaptor body 40. The protective cap 14 (shown in FIG. 1) is dimensioned so that, when engaged with the anchoring element 20, the second end face 60 of the connector retaining element 50 abuts the inner wall of the closed end portion 62 of the protective cap 14. As movement of the adaptor body 40 is restrained by the sleeve 46 attached to the cable 12, the connector retaining element 50 retains the cable optic component 26 and the connector 30, preventing any linear movement of the connector 30 with respect to the cable 12.

The connector retaining element 50 further includes an outer wall 64 which has a complementary shape with respect to the shape of the cavity of the protective cap 14 so that, when the protective cap is in place, the connector 30 and the connector retaining element 50 abut an inner wall of the protective cap 14. This prevents any pivotal movement of the connector 30 with respect to the adaptor body 40. Therefore, the protective cap 14 substantially restrains any movement of the connector 30 with respect to the cable 12.

By preventing movement of the connector 30 relative to the cable 12, the protective cap 14 and the connector retaining element 50 protect the connector and the cable from damage when, for example, the cable 12 and the adaptor 10 associated thereto are stored and/or transported.

In order to associate the adaptor 10 to the cable 12, the following steps are generally performed.

Figure 5:
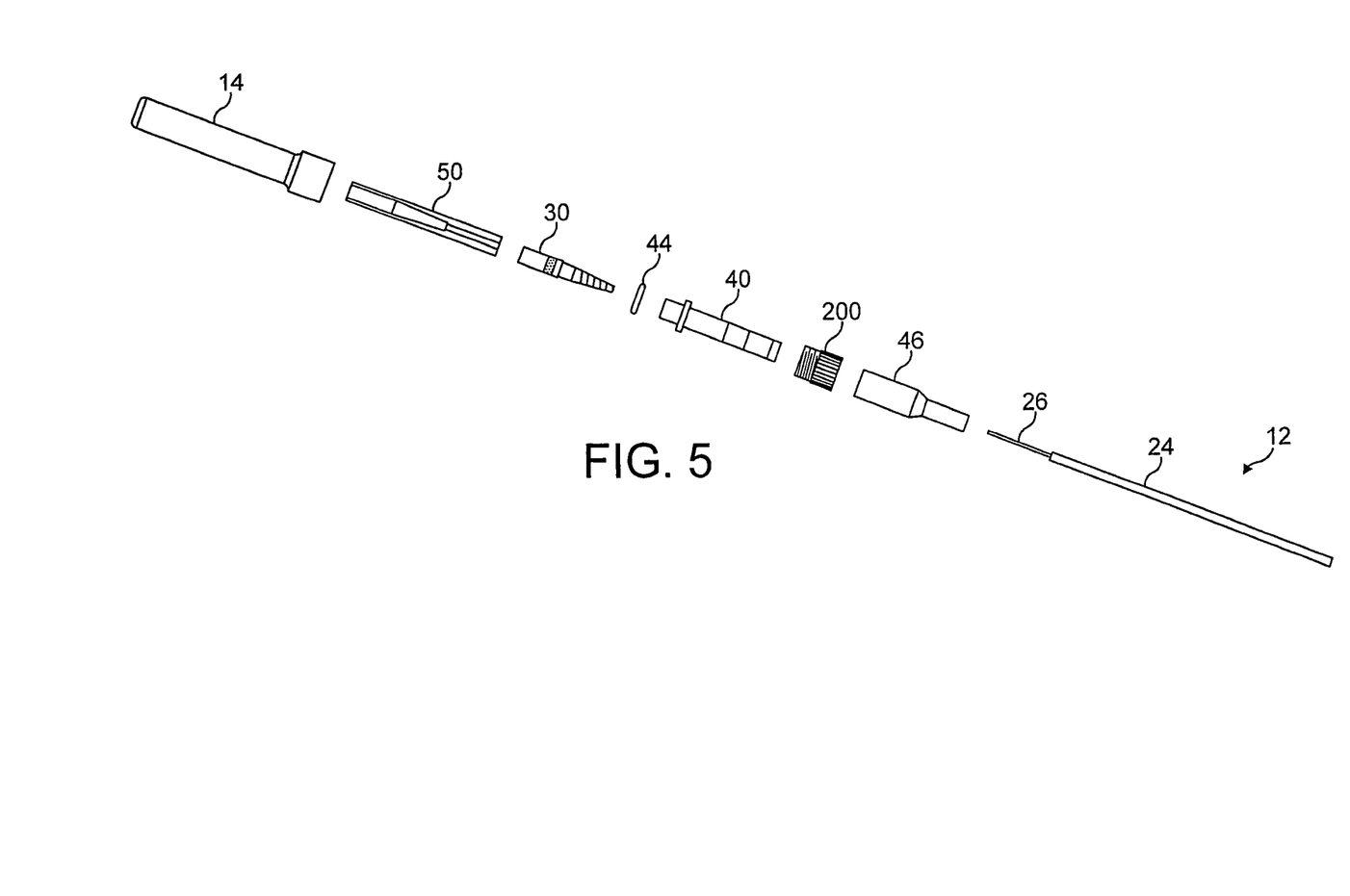
FIG. 5 illustrates an exploded perspective view of the components of the cable adaptor of FIG. 1.

Reference is made to FIG. 5 wherein an exploded view of the cable adaptor elements is shown as well as to FIGS. 9 to 17 wherein the subsequent steps for associating the cable adaptor 10 to the cable 12 are schematically represented.

Figure 9:
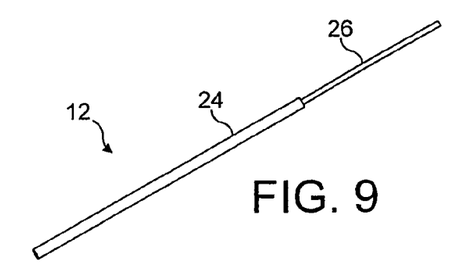
FIGS. 9 to 16 show the relevant steps for performing the method of installing according to the present invention.

With reference to FIG. 9, the protective outer sheath 24 of a cable end portion is removed to expose a portion of the cable optic component 26.

Figure 10:
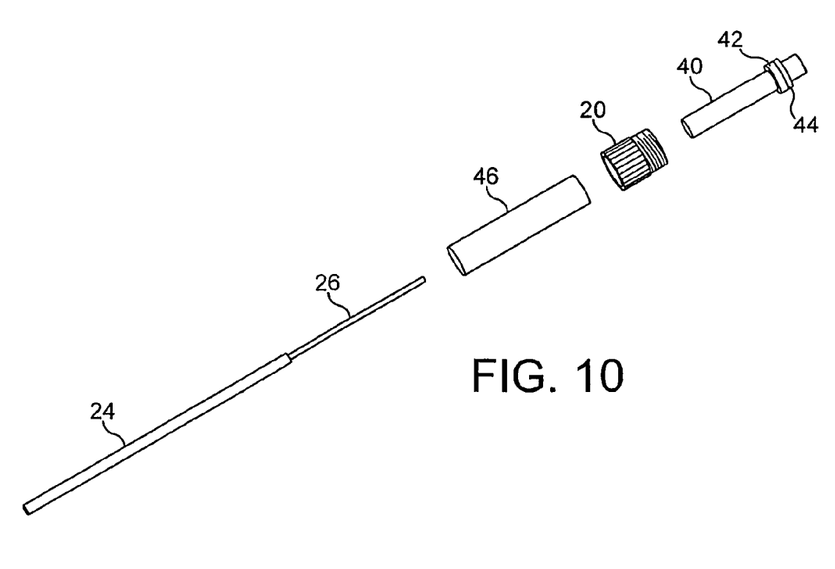
Figure 11:
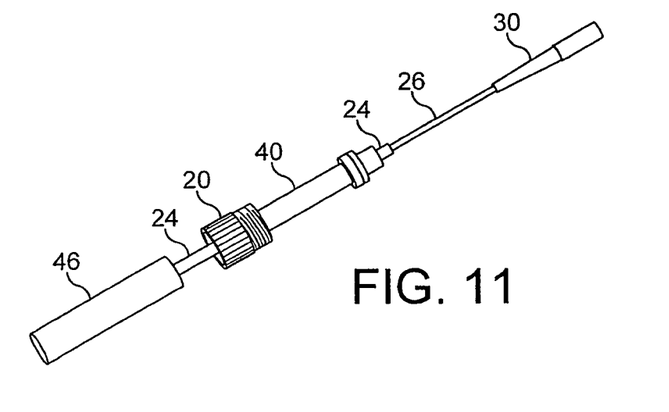

With reference to FIG. 10, the cable 12, with the exposed optic component 26, is introduced into—respectively—the sleeve 46, the anchoring element 20 and the adaptor body 40 around which the O-ring seal 44 has been already provided in abutment to flange 42 possessed by the adaptor body 40.

Successively (reference is made to FIG. 11), the connector 30 is installed to the end portion of the exposed optic component 26 according to any technique known in the art.

Figure 12:
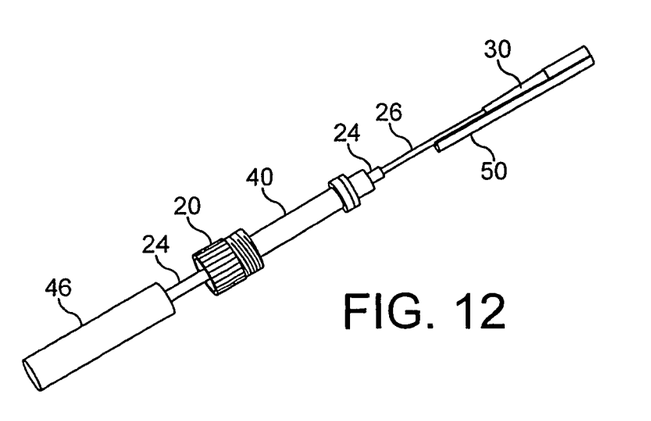

As shown in FIG. 12, once the connector 30 has been installed, the connector retaining element 50 is positioned around the connector 30 and the optic component end portion so that they are firmly and correctly retained inside the connector retaining element 50.

Figure 13:
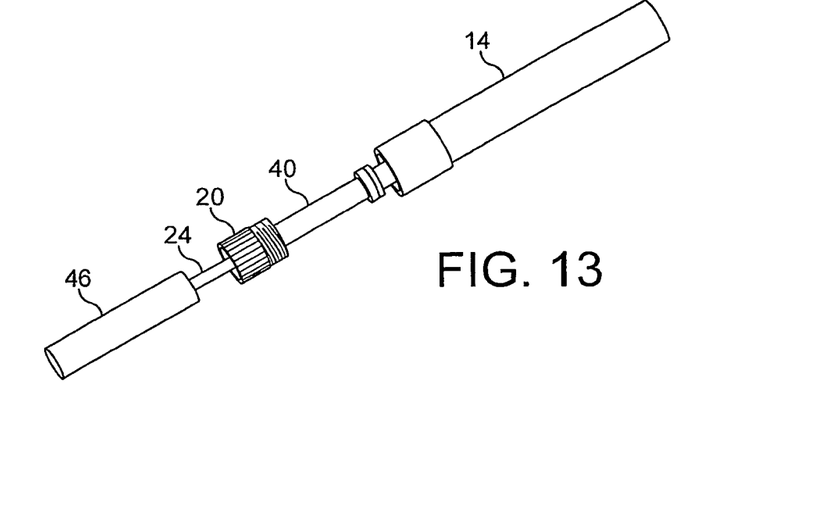

Successively, as partially shown in FIG. 13, the adaptor body 40 is arranged so that the first end face 58 of the connector retaining element 50 abuts the adaptor body 40. At this stage the cable 12 is gently pulled to remove any slack between the optic component 26 and the connector 30.

Figure 14:
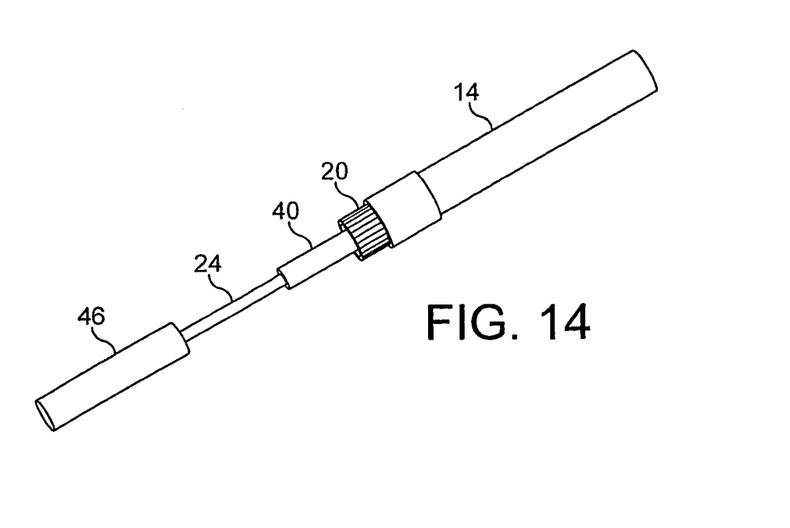

Successively, as shown in FIG. 14, the anchoring element 20 is moved to abut the flange 42 of the adaptor body 40 and the protective cap 14 is screwed to the complementary threaded portion 22 of the anchoring element 20.

Figure 15:
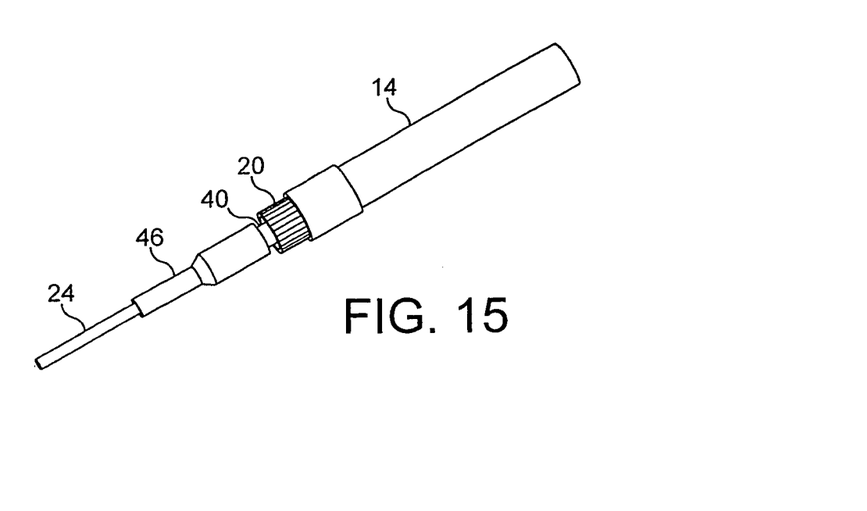

As shown in FIG. 15, the sleeve 46 is then arranged to cover a portion of the cable end as well as the portion of the adaptor body 40 which is not engaged by the anchoring element 20. Heat is then applied to the sleeve 46 thereby making the latter to shrink and to firmly join the adaptor body 40 to the cable 12.

As mentioned above, the anchoring element 20 is free to move down the cable 12 in the direction away from the adaptor body 40. However, flange 42 of the adaptor body 40 has an outer diameter greater than the inner diameter of the anchoring element 20 and prevents movement of the anchoring element 20 along the cable 12 towards the connector 30.

Figure 16:
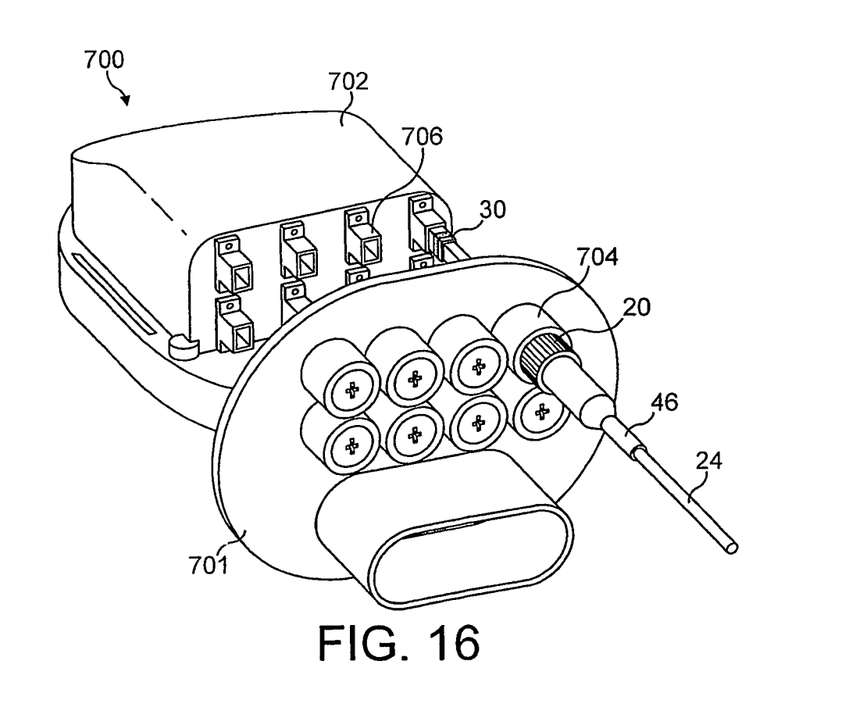

FIG. 16 shows a joint closure 700 to which a cable adaptor 10 is connected. In detail, FIG. 16 shows the anchoring element 20 engaging the base port 704 and the connector 30 plugging into the joint adapter 706. According to the present invention, the distance defined between the connector end position, once the connector has been plugged into a joint adapter 706, and the axial edge 45 of the adaptor body 40, once the latter is introduced into the base port 704 corresponding to the joint adapter 706, can be set at the factory by providing the cable adaptor 10 with the connector retaining element 50. In fact, the connector retaining element 50 accurately defines and set the correct distance between the adaptor body 40 and the connector 30 so that an easy and very quick plug-in operation is requested to be performed by the installer.

According to the present invention, the method of installing a fibre optic cable into a fibre optic receptacle, e.g. a joint closure, comprises the following steps.

The installer unscrews the protective cap 14 from the threaded portion 22 of the anchoring element 20 thereby accessing to the connector retaining element 50. Successively, the installer removes the connector retaining element 50 from the cable adaptor 10. Then the installer makes the connector 30 to pass through a base port of the base element of the joint closure and plugs the connector 30 into a corresponding joint adapter of the adapter unit. Successively, the installer fixes the anchoring element 20 to the base element by screwing the threaded portion 22 into a complementary threaded portion possessed by the base port.

As mentioned above, thanks to the connector retaining element 50 of the cable adaptor 10 of the present invention, the installer is only requested to plug in the connector and to screw the anchoring element since the correct cable length between the connector and the anchoring element (said length corresponding to the distance between the base port and the joint adapter) is predetermined and set in the factory where, moreover, the connector and the sleeve are safely and correctly associated to the cable too.

The invention claimed is:

1. A cable adaptor for a fibre optic cable, said fibre optic cable comprising at least one optic component, the cable adapter comprising:
    a connector for creating a fibre optic connection between an end portion of the optic component and a fibre optic receptacle;
    an anchoring device for anchoring the fibre optic cable to the fibre optic receptacle; and
    a connector retaining element for receiving the connector and said end portion of the optic component, the connector retaining element having a first end and second end, the first and second ends defining a channel, and the connector retaining element removably engaging the anchoring device;
    wherein the channel shares an optical pathway with the optic component; and
    wherein the optic component is configured to transmit light along the optical pathway when the connector retaining element is engaging the anchoring device.

2. The cable adaptor of claim 1, wherein the connector retaining element substantially encapsulates the connector when the connector retaining element engages the anchoring device.

3. The cable adaptor of claim 1, wherein the connector retaining element substantially encapsulates the end portion of the optic component when the connector retaining element engages the anchoring device.

4. The cable adaptor of claim 1, wherein the anchoring device comprises an anchoring element.

5. The cable adaptor of claim 4, wherein the anchoring element comprises a threaded portion.

6. The cable adaptor of claim 4, further comprising a seal interposed between the connector retaining element and the anchoring element.

7. The cable adaptor of claim 6, wherein an adaptor body co-operates with the seal.

8. The cable adaptor of claim 6, wherein the seal abuts a flange.

9. The cable adaptor of claim 8, wherein the seal abuts a flange side which faces an adaptor body axial edge in proximity of the connector retaining element.

10. The cable adaptor of claim 6, wherein the seal is an O-ring.

11. The cable adaptor of claim 1, wherein the anchoring device further comprises an adaptor body.

12. The cable adaptor of claim 11, wherein the adaptor body comprises a flange in proximity of an adaptor body axial edge facing the connector retaining element.

13. The cable adaptor of claim 12, wherein an anchoring element abuts the flange.

14. The cable adaptor of claim 13, wherein the anchoring element abuts the flange side opposing the adaptor body axial edge that faces the connector retaining element.

15. The cable adaptor of claim 11, further comprising a sleeve for attaching said adaptor body to said fibre optic cable.

16. The cable adaptor of claim 15, wherein the sleeve surrounds at least a portion of the adaptor body.

17. The cable adaptor of claim 15, wherein the sleeve is a heat shrinkable sleeve.

18. The cable adaptor of claim 1, further comprising a protective cap which encloses said connector retaining element.

19. The cable adaptor of claim 18, wherein the protective cap is provided with a cavity the shape of which at least partially mates an outer profile of the connector retaining element.

20. The cable adaptor of claim 18, wherein the protective cap has a first closed extremity that is located in correspondence with the optic component end portion provided with the connector.

21. The cable adaptor of claim 18, wherein the protective cap has a second open extremity for allowing introduction of the fibre optic cable into the protective cap.

22. The cable adaptor of claim 21, wherein the protective cap is provided with a seat in correspondence with said second open extremity.

23. The cable adaptor of claim 22, wherein the seat is provided with a shoulder.

24. The cable adaptor of claim 22, wherein the seat is provided with a threaded portion.

25. The cable adaptor of claim 22, wherein a threaded portion of the seat is complementary with a threaded portion of an anchoring element.

26. The cable adaptor according to claim 18, wherein the connector retaining element has an outer wall which has a complementary shape with respect to a cavity shape of the protective cap.

27. The cable adaptor according to claim 1, wherein the connector retaining element has a predetermined length.

28. The cable adaptor according to claim 1, wherein the connector retaining element comprises a cable holder and a connector holder.

29. The cable adaptor according to claim 28, wherein the connector retaining element has a first end face in correspondence with an axial edge of the cable holder.

30. The cable adaptor according to claim 29, wherein the connector retaining element has a second end face in correspondence with an axial edge of the connector holder.

31. The cable adaptor according to claim 29, wherein the first end face abuts an edge of an adaptor body.

32. A system for plugging a fibre optic cable into a fibre optic receptacle comprising:
a base element comprising at least one base port;
an adapter unit comprising at least one adapter, said at least one adapter and said at least one base port being spaced a predetermined length; and
a cable adaptor of claim 1.

33. The system according to claim 32, wherein the fibre optic receptacle is a joint closure.

34. The system according to claim 32, wherein the cable anchoring device comprises an anchoring element.

35. The system according to claim 34, wherein the adapter unit is associated with the base element by means of a bracket.

36. The system according to claim 34, wherein the base port comprises a threaded portion that is complementary to a threaded portion possessed by the anchoring element.

37. The system according to claim 32, wherein the cable anchoring device comprises an adaptor body.

38. The system according to claim 37, wherein said predetermined length is defined between a connector end position, once the connector has been plugged into the adapter, and an axial edge of the adaptor body, once the adaptor body is introduced into the base port corresponding to said adapter.

39. The system according to claim 32, wherein the base port and the corresponding adapter are substantially aligned.

40. The system according to claim 32, wherein the adapter unit comprises a front side and a rear side.

41. The system according to claim 40, wherein the front side locates a fibre routing system for routing in a joint closure at least one optic fibre of the fibre optic cable.

42. The system according to claim 40, wherein the rear side locates at least one splicing tray and at least one storage area of at least one optic fibre of the fibre optic cable.

43. A method of installing a fibre optic cable into a fibre optic receptacle, said fibre optic receptacle comprising:
a base element comprising at least one base port, and
an adapter unit comprising at least one adapter, said at least one adapter and said at least one base port being spaced a predetermined length;
said method comprising the steps of:
providing the fibre optic cable with a cable adaptor of claim 1,
removing the connector retaining element from the cable adaptor;
making the connector pass through said base port;
plugging the connector into said adapter; and
fixing the anchoring device to said base port.

44. The method according to claim 43, further comprising the step of unscrewing a protective cap from the anchoring device.

45. The method according to claim 43, wherein the step of fixing the anchoring device to the base port comprises the step of screwing a threaded portion possessed by an anchoring element of the anchoring device into a complementary threaded portion possessed by the base port.

46. A system for plugging a fibre optic cable into a fibre optic receptacle, said fibre optic receptacle comprising:
a base element comprising at least one base port, and
an adapter unit comprising at least one adapter, said at least one adapter and said at least one base port being spaced a predetermined length;
said system comprising:
a cable adaptor associated with said fibre optic cable, the cable adaptor comprising:
a connector for being plugged into said adapter;
an anchoring device for anchoring said fibre optic cable to said base port; and
a connector retaining element for receiving the connector and a cable end portion, the connector retaining element defining said predetermined length and removably engaging the anchoring device;
wherein the adapter unit comprises a front side and a rear side; and
wherein the rear side locates at least one splicing tray and at least one storage area of at least one optic fibre of the fibre optic cable.

* * * * *

UNITED STATES PATENT AND TRADEMARK OFFICE
CERTIFICATE OF CORRECTION

| | | |
|---|---|---|
| PATENT NO. | : 8,591,124 B2 | |
| APPLICATION NO. | : 12/310617 | |
| DATED | : November 26, 2013 | |
| INVENTOR(S) | : Griffiths et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this
Second Day of June, 2015

Michelle K. Lee
*Director of the United States Patent and Trademark Office*